United States Patent Office 3,469,506
Patented Sept. 30, 1969

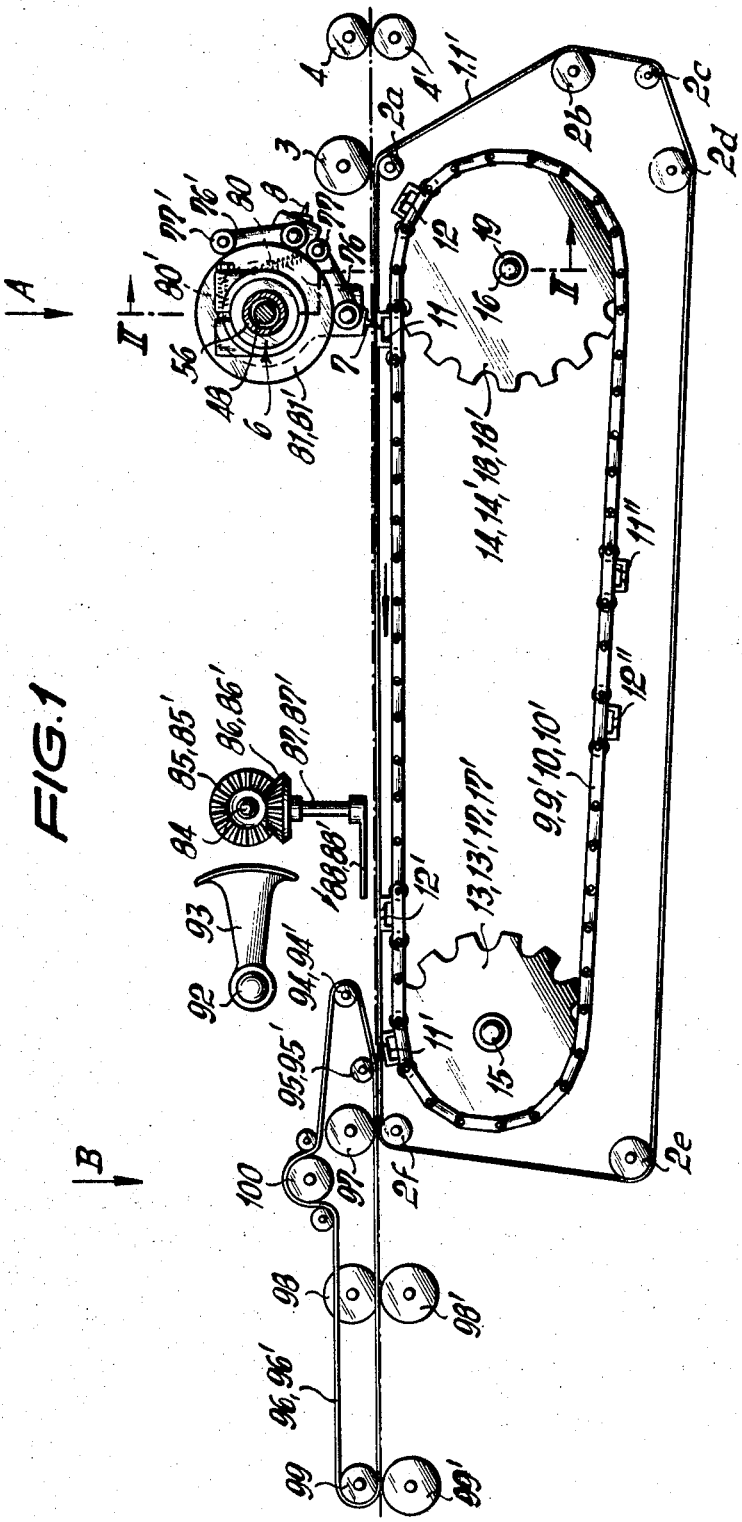

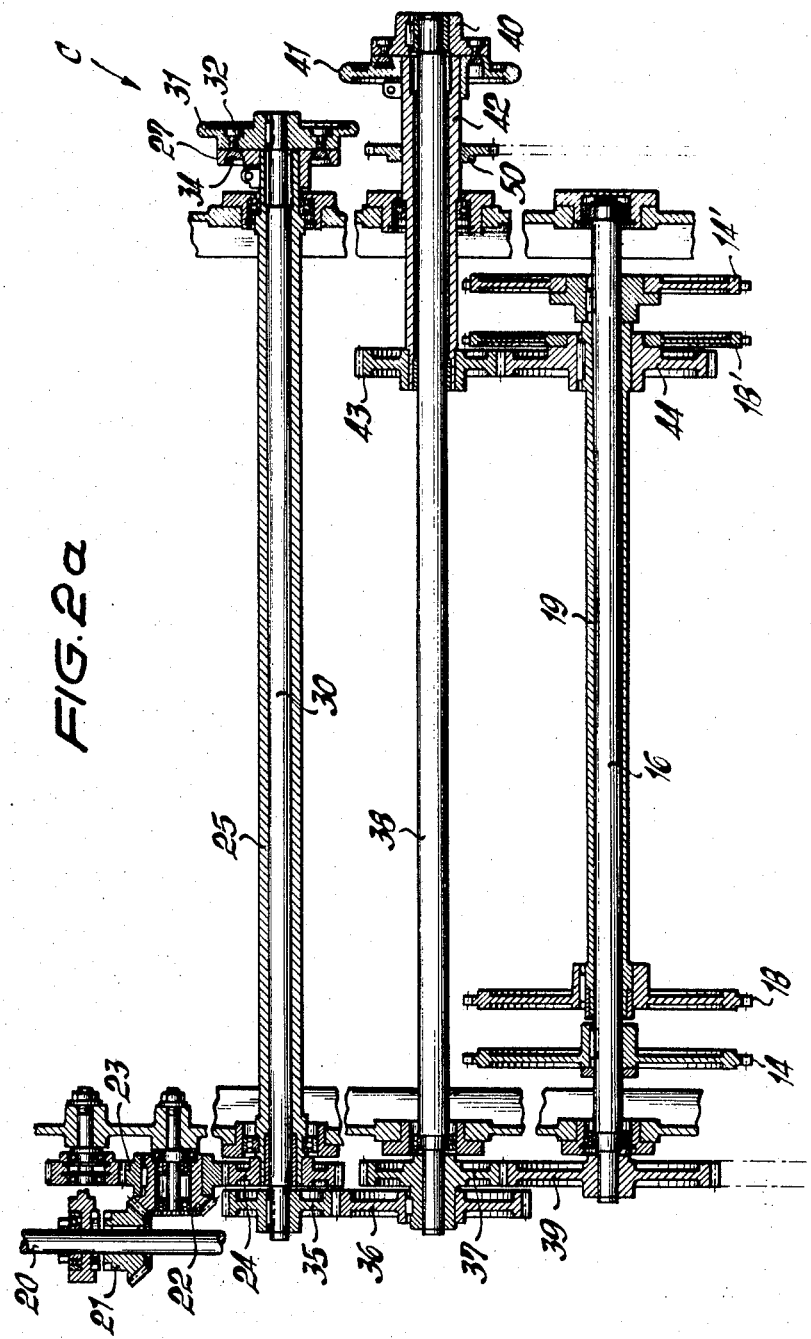

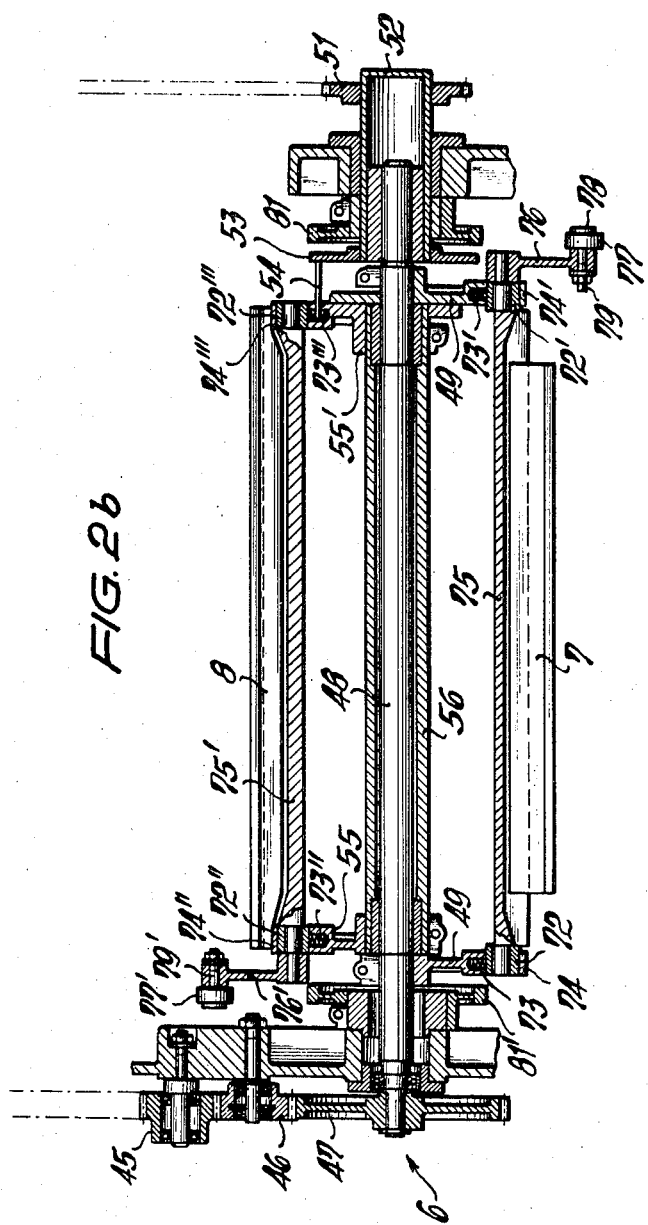

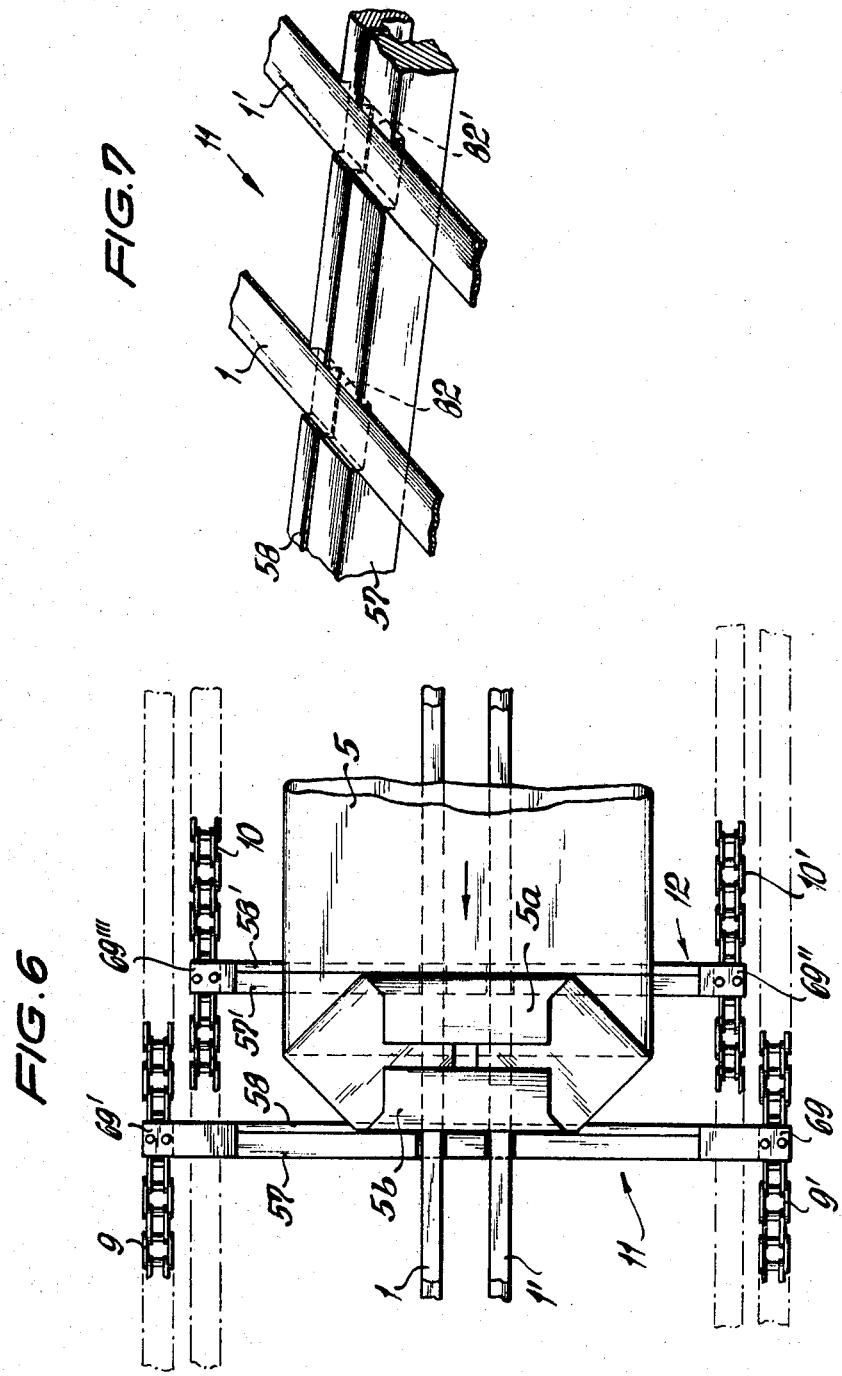

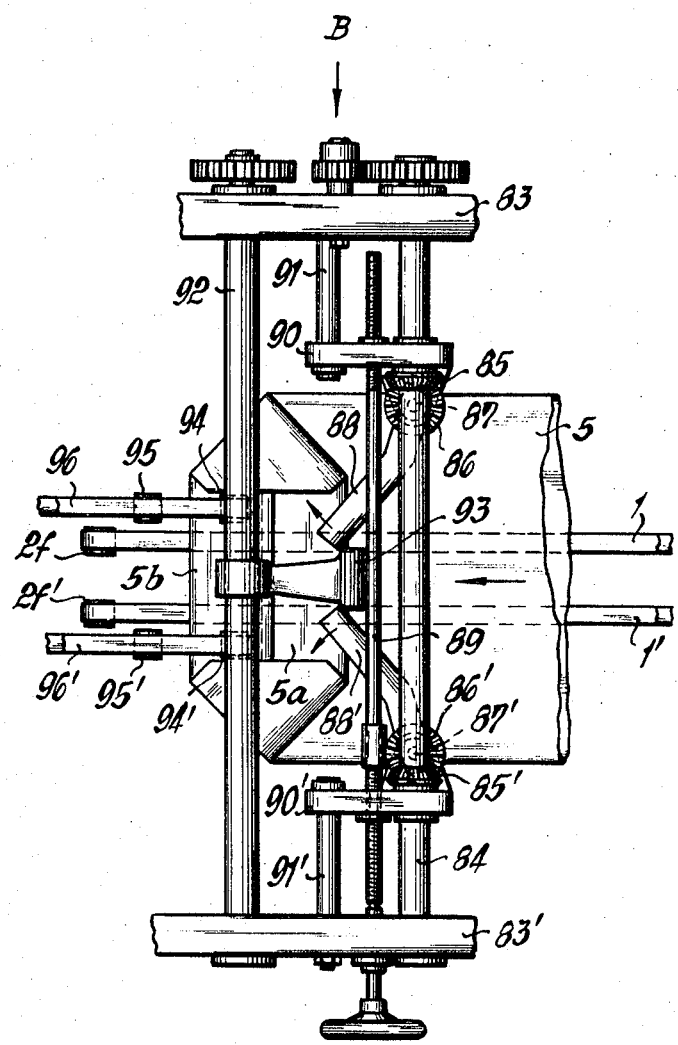

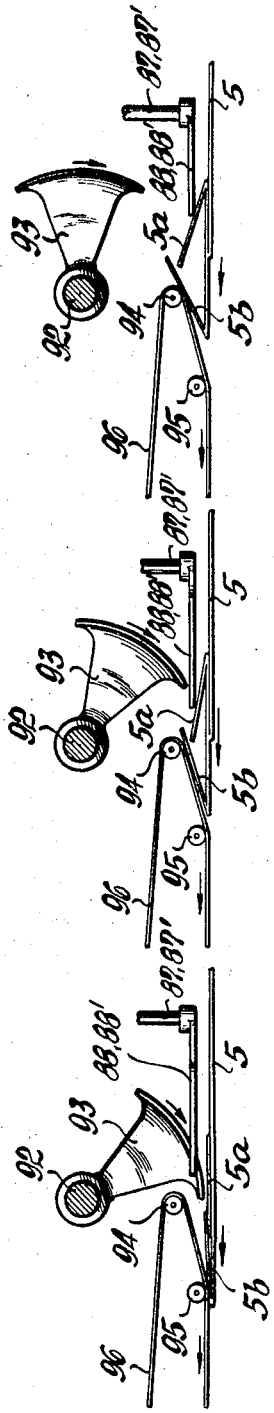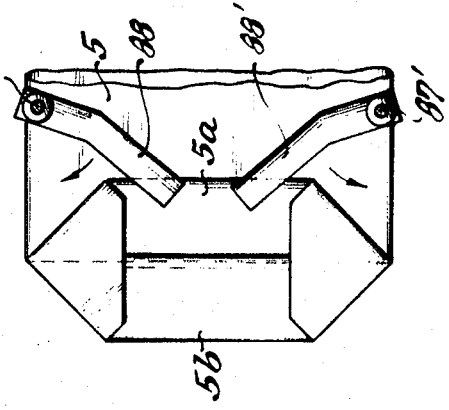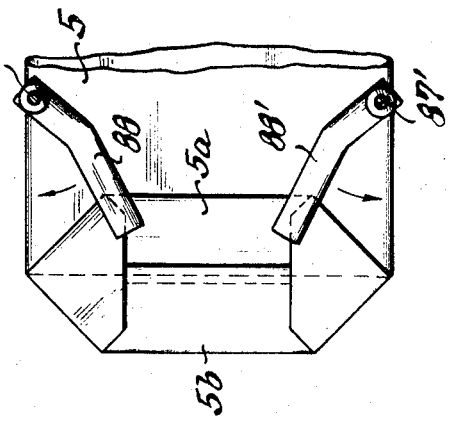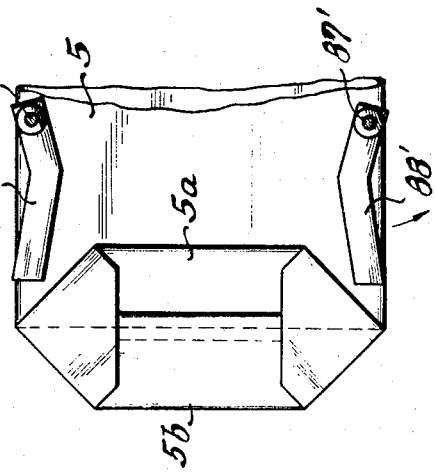

3,469,506
BOTTOM CREASING AND CLOSING APPARATUS IN MACHINES FOR MAKING OPEN, CROSSED-BOTTOM SACKS
Willi Stork, Tecklenburg, Germany, assignor to Windmoller & Holscher, Lengerich, Westphalia, Germany
Filed Mar. 21, 1967, Ser. No. 624,815
Claims priority, application Germany, Apr. 2, 1966, W 41,281
Int. Cl. B31b 1/54, 39/04
U.S. Cl. 93—27                                         9 Claims

ABSTRACT OF THE DISCLOSURE

The workpiece is acted upon by creasing devices while it is moved along a substantially flat path by conveyor elements, which consist only of creasing grippers, which cooperate with creasing knives to form the leading and trailing bottom creases. The grippers grip the workpieces at the bottom creases and move them under the closing tools.

---

Figure 3:
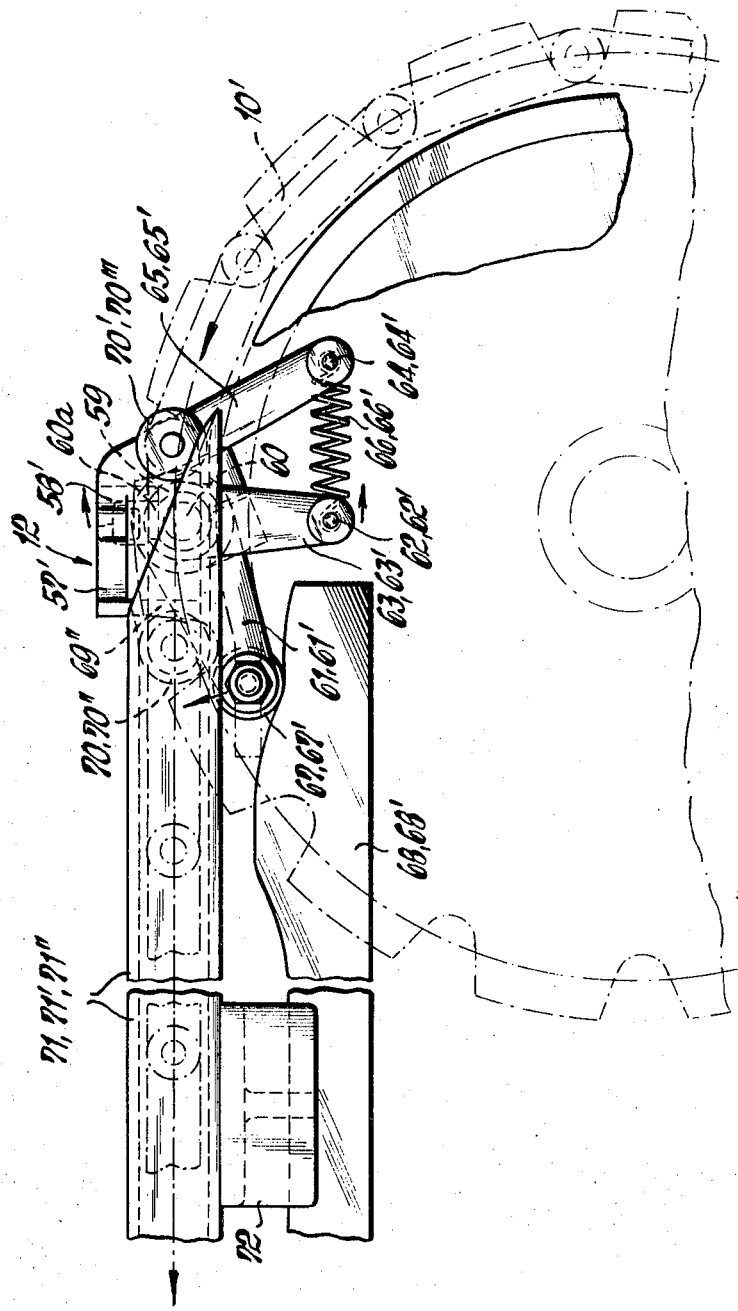

This invention relates to a bottom creasing and closing apparatus in a machine for making open, crossed-bottom sacks, which apparatus is disposed in the machine between the stations for pulling open flattening the bottom square and for applying adhesive, on the one hand, and the delivery station, on the other hand. In the bottom creasing and closing apparatus according to the invention, the open crossed-bottom sacks are made from the tube sections which are continuously fed in the longitudinal direction. The apparatus has a substantially flat path of conveyance for the workpiece, creasing devices and conveyor elements which are secured to endless conveyor chains.

In a known bottom creasing and closing apparatus of the type described (U.S. patent specification No. 935,729) the tube sections which are conveyed at a uniform speed must be transferred to different successive holding means while the sacks move through the processing stations. During the formation of the bottom square, the workpiece is held between two plates. Thereafter the workpiece is received by a leading gripper, which is assisted in the bottom creasing station by lateral grippers. Rotating creasing knives cooperate with creasing grooves formed in tool plates. Before the workpiece is creased, its leading bottom flap is released in that the leading gripper is lifted and the workpiece is now moved only by the lateral grippers until the leading end has entered between a pair of rolls, which cooperate with a vertically revolving infolding finger to close the bottom of the workpiece, the trailing flap being laid over the leading one.

This apparatus has the significant disadvantage that the creasing tools produce only a fold line and the bottom flaps are then left to themselves so that it is not ensured that the bottom flaps are infolded actually at the fold lines, particularly when the material is not very stiff.

The same disadvantages are involved in another sack making machine, in which the tube sections are longitudinally fed by conveyor chains in the bottom creasing and closing apparatus and the bottom is creased and folded in said apparatus on a conveyor path which extends substantially in a plane (U.S. patent specification No. 2,325,042). To hold the workpieces moving through the bottom creasing and closing apparatus, grippers are provided on three conveyor chains which lie one beside the other. The grippers carried by the intermediate chain grip the tube section, coming from the adhesive applying station, at its leading end. The grippers carried by the two outer chains grip the trailing end of the tube section. The bottom closing station comprises reciprocating elements, namely, finger and an infolding plate. These reciprocating elements are not desirable, particularly at relatively high working speeds, because their inertia must be overcome. Another disadvantage resides in that the leading bottom flap is held by a gripper after the creasing operation until said flap is immediately before the bottom closing station. This fact may prevent the flap from springing up whereas such spring-up is required for a satisfactory infolding of the leading bottom flap. This disadvantage is particularly significant with soft papers and when the leading flap is provided with adhesive. Besides in this machine too the conveyor chains are only provided with grooved plates for cooperating with the creasing knives so that an infolding of the bottom flaps on the fold lines is not ensured particularly during the processing of relatively soft material.

In another known apparatus of the type under discussion (German patent specification No. 305,978), the workpieces are moved in a plane by an endless pair of belts whereas the infolding of the bottom flaps is effected with the aid of an infolding tool, which moves back and forth. The movement of the workpiece between endless conveyor belts involves the significant disadvantage that the ends of the creases defining the bottom flaps must be aligned as closely as possible with the conveyor belts. Otherwise, portions of the leading or trailing bottom flap may come under the conveyor belts so that they cannot be accurately infolded when the bottom is being closed. This fact increases the susceptibility of the apparatus to trouble. The inertia of the infolding elements moving back and forth prevents also a high-speed movement of the workpieces.

A machine for making cross-bottom sacks from paper is known (e.g., U.S. patent specification No. 1,583,392), in which the tube sections, which are longitudinally conveyed, are creased by creasing knives cooperating with creasing grippers and are moved through the bottom closing station only by the creasing grippers, which grip the creases. The leading and trailing creasing grippers are relatively adjustable in dependence on the desired width of the sack bottom. The bottom closing station comprises only rotary elements. In this machine, the path along which the workpiece is conveyed does not lie in a plane but on a cylinder. This movement on a cylinder involves significant disadvantages. With a given length of the processing path, the centrifugal forces acting on the workpiece material, mainly paper, during the creasing and closing of the bottom increase with the processing speed. To reduce these forces to an allowable value, the length of the processing path must be increased. With cylinders, this involves a considerable increase in diameter. Only the accessible top portion of the cylinder can be used for processing. It must also be borne in mind that the periphery of the cylinder is preferably always an even multiple of the length of the longest workpiece to be processed because cylinders having an odd number of workpiece fields can be made only with difficulty and involve unfavorable transmission ratios. Besides, the width of the working surface of the cylinder must be selected in view of the widest sack to be made. For the above reasons, a high output can be obtained only with a very large cylinder if the centrifugal forces acting on the workpiece are to be kept within a tolerable range. Such cylinder involves high manufacturing costs and can be machined only with special equipment. Significant disadvantages are also due to the fact that the creasing grippers which move the workpieces and engage the bottom creases thereof are mounted only on one cylinder. For this reason, the relative adjustment of the creasing grippers which is required for a change of the bottom width is time-consuming because this requires, e.g., also an adjustment of the cams for the creasing grippers. With relatively adjustable creasing grippers, gaps in the peripheral surface are inevitable. These gaps must be bridged by so-called gap-filling segments, which must be relocated whenever the distance between the two creasing grippers has been changed.

Owning to these disadvantages of the sack making machine comprising a bottom forming cylinder, e.g., according to the U.S. patent specification No. 1,583,392, another apparatus for making crossed-bottom sacks has been developed, in which the formation of the leading crease of the bottom and the infolding of the leading bottom flap are effected on a first cylinder and the formation of the trailing bottom crease and the infolding of the trailing bottom flap are effected on a second cylinder. The apparatus can be adjusted to a different width of the sack bottom by a change of the phase angle between the first and second cylinders. This arrangement will avoid, e.g., a poor contact of the tube section with the periphery of the cylinder, whereas such poor contact may occur when two relatively adjustable creasing grippers are disposed on only one cylinder owing to thee long sliding gaps provided in the cylinder to enable an adjustment in the desired range. On the other hand, this two-cylinder arrangement has the other disadvantage, described above, of the machines provided with one processing cylinder and these disadvantages are even doubled as far as the space requirements and the difficulties involved in the manufacture and machining of the cylinders are concerned.

It is an object to the invention to provide for machines for making large sacks a bottom creasing and closing apparatus which ensures a satisfactory creasing of the bottom and infolding of the bottom flaps of longitudinally conveyed sacks even at high processing speeds whereas the workpieces being processed are not subjected to disturbing mass forces and the manufacturing costs and the space requirements are not economicaly prohibitive.

In a bottom creasing and closing apparatus in sack making machines for the manufacture of open, crossed-bottom sacks from tube sections which are continuously conveyed in their longitudinal direction, which machine comprises a substantially flat path of conveyance for the workpiece, creasing devices, and conveyor elements secured to endless conveyor chain, this object is accomplished in that the conveyor elements consist only of creasing grippers, which cooperate with creasing knives to form the leading and trailing bottom creases and which grip the workpieces at the bottom creases and move them under the closing tools. As the workpieces are moved only by the creasing grippers, the position of the bottom creases can be absolutely reliably defined without need for additional devices, such as further grippers disposed in front and on the sides, and it can be ensured at the same time that the bottom flaps are in fact creased at the desired points. The leading and trailing bottom flaps, which are provided with adhesive, stand up freely so that they do not soil any conveyor means, and can easily be gripped by the infolding elements in the closing station. This is particularly desirable in the manufacture of special sacks having wide bottoms because the bottom square which has been pulled open extends beyond the trailing end of the sack, and previously known leading infolding elements carried by chains move under the trailing bottom flap and in doing so can easily enter the open end of the sack so that the workpiece can be damaged. When the workpiece is conveyed only by creasing grippers, rotary elements for infolding the bottom flaps may be used in the closing station so that the above-mentioned disadvantage is reliably avoided.

In a development of the invention it must be borne in mind that a change of the width of the sack bottom of workpieces having overlapping bottom flaps requires a change of the length of the bottom flaps. With workpieces in which the bottom flaps do not overlap, such as special sacks having a load-carrying inner strap and a bottom cover sheet, a change of the width of the sack bottom does not involve a change of the length of the bottom flaps and the width of the sack bottom may be left unchanged when the length of the bottom flaps is to be increased or reduced.

To enable a simple change of the length of the bottom flaps, a drive branch for driving all creasing grippers and creasing knives may be coupled to the main drive shaft of the sack making machine, which drive branch comprises a clutch for jointly adjusting the phase angle of the creasing and conveying tools with respect to the main drive shaft. The pairs of conveyor chains which carry the creasing grippers, and the associated creasing knives, can be uncoupled from the main drive shaft. By the rotation of one wheel, the conveying phase angle of the entire creasing and conveying system can be adjusted relative to the leading edge of the workpiece to define the length of the leading bottom flap. The length of the trailing bottom flap will then be determined by the selection of the total width of the pulled-open bottom and the bottom width, corresponding to the distance between the creases. The advantages of this development of the invention reside in the fact that said adjusting wheel can be uncoupled and coupled with a few manipulations and the adjustment can be easily effected. To increase the length of the bottom flaps, all movable parts which cooperate in creasing are displaced or turned rearwardly relative to the leading edge of the workpiece. To decrease the length of the bottom flap, a displacement or rotation in the forward direction is effected. When the adjusting wheel is then locked, the entire conversion of the machine in this section has been completed.

To enable a change of the width of the bottom, common drive branches for driving the creasing grippers and creasing knives for the leading and trailing bottom creases, respectively, may be provided, and one of said two drive branches may incorporate a clutch for jointly adjusting the phase angle of the tools driven by this drive branch. Just as in the case of a change of the length of the bottom flaps described hereinbefore, an adjustment of the rear creasing devices relative to the forward ones can be effected by a rotation of a wheel or the like. In this way, the uncoupling, adjustment and locking of the wheels for the relative adjustment of the creasing devices can be performed with a few manipulations.

To prevent a damage to or a poor creasing of the workpieces, which are moved by conveyor chains along a straight line, a further development of the invention resides in that the creasing knives are rotatable and are resiliently and pivotally mounted and controlled by cams. This arrangement enables an exact penetration of the knives into the grippers during the creasing operation. The resilient mounting permits the creasing knife to yield under an overload. Besides, the knife position can easily be adjusted to the adjusted position of the creasing grippers. The use of rotary creasing knives has the advantage that accelerating or retarding forces are not effective and that the knives can be provided with bearings having a low wear so that high manufacturing speeds are enabled. For this reason, it is a further development of the invention to use only rotating processing elements in the bottom closing station. According to the invention, these elements may consist in known manner of infolding fingers, which rotate on vertical axes, for the trailing bottom flap, and a succeeding infolding segment, which rotates about a horizontal axis and which during its rotation does not contact the plane of conveyance at those portions of the sack blanks which are not infolded and has a higher speed than the workpieces to be processed.

The invention will be described more fully hereinafter with reference to the drawing, which shows an embodiment by way of example.

FIG. 1 is a diagrammatic side elevation of the bottom creasing and closing apparatus according to the invention in a sack making machine.

Figure 4:
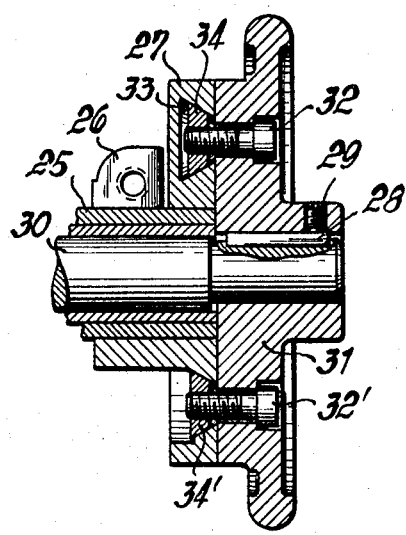
Figure 5:
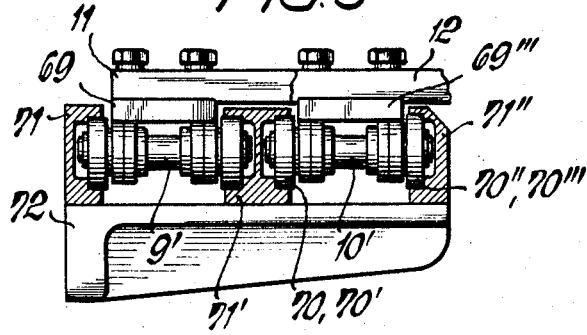

FIGS. 2a and 2b are partly exploded sectional views taken on line II—II of FIG. 1, FIG. 3 a side elevation showing a trailing creasing gripper and the means for guiding and controlling said gripper, FIG. 4 an enlarged view showing the clutch C of FIG. 2, FIG. 5 a sectional view showing the guides for the carriages associated with the leading and trailing creasing grippers and the means for fixing the creasing grippers to the carriages, FIG. 6 a top plan view showing the workpiece conveyor adjacent to the bottom closing station, the bottom closing elements being omitted, FIG. 7 a perspective view showing the guidance of the conveyor belt in recesses in a leading creasing gripper, and FIG. 8 a top plan view showing the bottom closing station, the creasing gripper device being omitted.

FIGS. 9a and 9b to FIGS. 11a and 11b are diagrammatical representations of three different phases of the movements performed to close the bottom.

Endless supporting belts 1, 1' (FIGS. 1, 6, and 7) extend around deflecting pulleys 2a, 2b, 2c, 2d, 2e and 2f and form a tube supporting path extending throughout the bottom creasing and closing station and supporting the workpieces 5 having a leading bottom square and coming from the station for applying adhesive to the bottom. The workpieces are fed to the bottom creasing and closing apparatus by feed roll pairs 4, 4' and 2a, 3. The bottom creasing station A (FIG. 1) comprises three pairs of creasing grippers 11, 11', 11", 12, 12' 12", which are carried by four endless conveyor chains 9, 9', 10, 10', which are relatively adjustable in pairs. The grippers serve also for moving the workpieces through the bottom creasing and closing apparatus. The bottom creasing station further comprises rotary creasing knives 7, 8, which are relatively adjustable and have a common axis of rotation 6.

The endless conveyor chains 9, 9' (FIGS. 1 and 6) which carry the leading creasing grippers 11, 11', 11", extend around four outer sprockets 13, 13' and 14, 14' (FIGS. 1 and 2). The sprockets 13, 13' are mounted on a shaft 15 below the bottom closing station B (FIG. 1) and the sprockets 14, 14' are mounted on a shaft 16 (FIGS. 1 and 2) below the bottom creasing station A (FIG. 1).

The inner endless conveyor chains 10, 10', which carry the trailing creasing grippers 12, 12', 12" extend around four inner sprockets 17, 17' and 18, 18'. The sprockets 17, 17' are rotatably mounted on the shaft 15 below the bottom closing station B (FIG. 1). The sprockets 18, 18' are secured to a hollow shaft 19 (FIGS. 1 and 2), which is rotatably mounted on the shaft 16 below the bottom creasing station A (FIG. 1).

The endless conveyor chains 9, 9', 10, 10' are driven by means of the sprockets 14, 14', 18, 18'. This drive just as that of the creasing knives 7, 8 is derived from the longitudinal shaft 20 (FIG. 2), which serves also for driving other elements, not shown, of the sack making machine in synchronism. According to FIG. 2, a bevel wheel 21 is secured to the longitudinal shaft 20 and connected to a spur gear 23 in mesh with a spur gear 24, which is connected to a hollow shaft 25. According to FIG. 4, a flange 27 is secured by a clamping hub 26 to the hollow shaft 25 and is detachably connected to a handwheel 31. The latter is mounted by a feather key 28 and a fixing screw 29 on a shaft 30 (see clutch C in FIG. 2). A release of the flange 27 from the handwheel 31 will thus disconnect the hollow shaft 25 from the shaft 30 contained in it. When the handwheel 31 is locked to the flange 27, the hollow shaft 25 is connected to the shaft 30. The means for detachably connecting the flange 27 and the handwheel 31 comprise round cap screws 32, 32', which extend into an annular dovetail groove 33 of the flange 27. This portion of each screw carries a dovetail nut 34, 34'. A rotation of the round cap screws mounted in the handwheel will pull the dovetail nuts against the annular groove wall of the flange to lock the flange and handwheel together, or will separate the nuts from the groove wall so that the flange and handwheel are unlocked and can be adjusted relative to each other.

It is apparent from FIG. 2 that the entire creasing gripper and creasing knife system is driven by the shaft 30 and its end wheel 35. For this reason, an adjustment of the handwheel 31 released from the flange 27 will adjust the entire creasing system relative to the leading edge of the workpiece. Such adjustment is necessary, e.g., for a change from crossed-bottom sacks having long bottom flaps to crossed-bottom sacks having short bottom flaps but the same bottom width. In this case, the length of the leading bottom flap can be reduced by the described adjustment. By means of the handwheel 31 the uncoupled creasing system is moved in the direction of travel by an amount by which the length of the leading bottom flap of the sack is to be reduced so that the bottom creases in the succeeding workpieces are formed earlier, closer to the leading edge of the workpiece.

The means for driving the individual creasing grippers and creasing knives comprise the above-mentioned spur gear 35, which is mounted on the shaft 30 and engages a spur gear 36. The latter is firmly connected to another spur gear 37, which is secured to a shaft 38 and drives the forward and rear creasing devices. To transmit the drive from the spur gear 37 to the leading creasing grippers 11, 11', 11", a shaft 16, which carries a spur gear 39, is driven by the latter. As has been mentioned hereinbefore, the outer sprockets 14, 14' are secured to this shaft (FIG. 2), and by the outer endless conveyor chains 9, 9' drive the leading creasing grippers 11, 11', 11" (FIGS. 1, 6), which will be described hereinafter.

To transmit a drive from the spur gear 37 to the forward creasing knife 7, the spur gear 39 drives a gear 45, which is in mesh with an idler gear 46, which drives a spur gear 47. The latter is secured to a shaft 48, which carries two mounting arms 49, 49' which carry the forward creasing knife 7, which will be described more fully hereinafter. A drive is transmitted from the spur gear 37 to the rear creasing device by means of a flange 40, which is carried by the shaft 38, on which the spur gear 37 is mounted. Just as has been described for the flange 27 and the handwheel 31, the flange 40 is releasably connected to a handwheel 41, which is secured to a hollow shaft 42. The latter surrounds the shaft 38 and drives the entire rear creasing device. When the flange 40 is firmly connected to the handwheel 41, the shaft 38 and the surrounding hollow shaft 42 will rotate. When the flange 40 and handwheel 41 are disconnected, the hollow shaft 42 can be rotated alone by the handwheel 41 so that the rear creasing device can be adjusted. When the distance between the leading and trailing bottom creases and the width of the bottom is to be changed, the flange 40 and handwheel 41 are disconnected and the latter is turned to adjust the rear creasing device relative to the rear creasing device, which is not adjustable. When the distance between the forward and rear creasing devices corresponds to the distance now desired between the bottom creases, the flanges 40 and handwheel 41 are reconnected.

In addition to the handwheel 41, the hollow shaft 42 for driving the rear creasing device carries two spur gears 43 and 50, which are secured to the hollow shaft 42. The spur gear 43 drives the trailing creasing grippers 12, 12', 12" and to this end meshes with a spur gear 44, which is secured to the above-mentioned hollow shaft 19. The inner sprocket 18' is carried by the spur gear 44. The second inner sprocket 18 is secured to the hollow shaft 19.

As described above, the inner sprockets 18, 18' drive the inner conveyor chains 10, 10', which carry the trailing creasing grippers, 12, 12', 12'', to be described hereinafter.

For driving the rear creasing knife 8, the spur gear 50 meshes with a spur gear 51, which is secured to a bushing 52. The latter carries a driver consisting of a driver disc 53 and a driver pin 54. The pin connects the driver dics 53 to a mounting arm 55', which is secured to a hollow shaft 56. The latter is rotatably mounted on the shaft 48. The arm 55' and a mounting arm 55 secured to the hollow shaft carry the above-mentioned rear creasing tool 8, which will be described hereinafter.

The arrangement and control of the creasing grippers and creasing knives will now be described. The leading and trailing creasing grippers 11, 12 are identical in their essential parts. Each of said grippers has a fixed leading jaw 57 or 57' and a movable trailing jaw 58 or 58' (FIGS. 3, 6 and 7). The fixed jaw 57' (FIG. 3) is provided with a plain bearing 59, in which a shaft is rotatably mounted, which has a flat portion 60a, to which the movable jaw 58 is secured. The shaft 60 also carries follower levers 61, 61', and spring-loaded levers 63, 63', which are provided with spring-connecting pins 62, 62'. Brackets 65, 65', which carry spring-connectig pins 64, 64', are screw-connected to the fixed jaw 57'. As the spring-connecting pins 62, 62' are fixed to the movable jaw 58' and the spring-connecting pins 64, 64' are fixed to the fixed jaw 57', a tension spring 66 mounted on the pins 62, 64 and a tension spring 66' mounted on the pins 62', 64' pull the movable jaw toward the fixed jaw of the gripper. Rollers 67, 67' are mounted on the levers 61, 61'. As the creasing gripper moves with the chains, the rollers 67, 67' roll over a pair of fixed cams 68, 68' to open the gripper against the force of the tension springs 66, 66' and to enable the latter to close gripper as the rolling movement is continued.

During the movement of the grippers, the trailing grippers 12, 12', 12'', and the leading grippers 11, 11', 11'' are opened and closed by means of the pair of cams 68, 68' so that the workpiece is gripped. To release the workpiece from the grippers, a pair of cams, not shown, are provided near the delivery end of the bottom closing station and have the same function as the pair of cams 68, 68'. The fixed jaw 57 of each leading creasing gripper 11 is mounted on two carriages 69, 69'. The fixed jaw 57' of each trailing creasing gripper 12 is mounted on two carriages 69'', 69''', (FIGS. 5, 6). The carriage 69 is articulatedly connected to the conveyor chain 9', the carriage 69' to the conveyor chain 9, the carriage 69'' to the conveyor chain 10' and the carriage 69''' to the conveyor chain 10, by chain pins (FIGS. 5, 6). Each of the carriages 69, 69', 69'', 69''' (FIGS. 3, 5, 6) has four wheels 70, 70', 70'', 70''' and is articulatedly connected to the conveyor chains 9, 9', 10, 10' which extend between the wheels. As is shown in FIG. 5 for the creasing grippers 11, 12 moved by the conveyor chains 9', 10' and the carriages 69, 69' on one side, the wheels roll in tracks 71, 71', 71'', which are mounted on brackets 72. Similar tracks, not shown, receive the wheels of the carriages 69', 69''', which carry the creasing grippers on the opposite side. The tracks for the carriage wheels on both sides of the creasing grippers extend throughout the length in which the creasing grippers are moved in a plane in the bottom creasing and closing apparatus. At their leading and trailing ends, the tracks are bevelled to facilitate the entrance of the carriage for the creasing grippers (FIG. 3). The tracks prevent an unintended, vertical and horizontal displacement of the creasing grippers as well as an undesired yielding of the grippers during the creasing operation. In a side elevation, the contact surface between the fixed and movable jaws of the creasing gripper is not vertical but inclined to the path of travel of the workpiece in a downward and rearward direction in the leading grippers and in a downward and rearward direction in the trailing grippers. The leading creasing grippers are moved by the two outer conveyor chains and the trailing creasing grippers by the two inner conveyor chains. For this reason, the leading creasing gripper is wider than the trailing one (FIG. 6). On the other hand, that portion which actually receives the folded workpiece has the same width in the leading and trailing grippers.

The arrangement and control of the creasing knives 7, 8, which enter the creasing grippers during the creasing operation, will now be explained with reference to FIGS. 1 and 2. The forward creasing knife 7 is rotatably and resiliently mounted. To this end, the levers 49, 49' are secured to the shaft 48 with set screws. These levers carry sliding blocks 72, 72', which are constantly urged by compression springs 73, 73' against the plates 74, 74', which are screw-connected to the levers. The forward creasing knife 7 is carried by a creasing knife holder 75, which is rotatably mounted in the slide blocks. A follower lever 76 is secured to the holder 75 and carries a roller 77, which is mounted by a bolt 78 and an acorn nut 79. A spring 80 (FIG. 1) is mounted on the acron nut 79 and pulls the follower lever 76 and the roller 77 against a fixed eccentric disc 81, which can thus control the forward creasing knife 7 as is required during its penetration into the creasing gripper. Owing to the resilient mounting of the creasing knife holder 75, the creasing knife 7 can yield to an overload together with the holder 75, the slide blocks 72, 72', and the follower lever against the force of the compression springs 73, 73'. The rear folding knife 8 is similar to the forward folding knife 7 in its arrangement and control. Levers 55, 55' are secured to the hollow shaft 56 and serve for a resilient and rotatable mounting of a knife holder 75', which carries the rear creasing knife 8. The levers 55, 55' carry slide blocks 72'', 72''', which are constantly urged against plates 74'', 74''' by compression springs 73'', 73'''. The rear creasing knife 8 is also controlled by an eccentric disc 81' by means of a follower lever 76', a roller 77' mounted on said lever, an acorn nut 79' and a tension spring 80' (FIG. 1) connected to said nut.

The creasing grippers grip the workpieces and simultaneously form the bottom flap creases so that the bottom flaps are slightly raised. The creasing grippers serve also for moving the workpieces to and through the bottom closing station. This ensures an exact infolding of the bottom flaps along the creases.

The means whereby this conveyance of the workpieces are effected are apparent from FIG. 6, which is a top plan view showing a crossed-bottom sack 5 with partly infolded bottom flaps 5a, 5b whereas the bottom closing station B which is apparent from FIGS. 1, 8, 9, 10 and 11 is omitted. The leading creasing gripper 11 is carried by the outer endless conveyor chains 9, 9'. The trailing creasing gripper 12 is carried by the inner endless chains 10, 10'. The creasing grippers 11 and 12 have gripped the leading portion of the crossed-bottom sack at its leading and trailing creases, as has been described, and move this portion of the sack through the bottom closing station. At this time, the trailing portion of the crossed-bottom sack rests on supporting belts 1, 1', which revolve at the same speed as the conveyor chains.

FIG. 7 shows the guidance of the endless supporting belts 1, 1' in recesses 82, 82' of a leading creasing gripper 11. It is apparent that the upper surface of the supporting belts is on a lower level than the top of those portions of the creasing gripper which are on both sides of the recesses. The depth of the recesses 82, 82' permits the supporting belts to yield downwardly during the creasing operation.

The bottom closing station shown in FIGS. 8, 9a, 9b, 10a, 10b, 11a, 11b comprise only rotary elements for infolding the bottom flaps and is disposed directly over the flat path of travel of the workpiece. For the sake of clarity, the conveyor and creasing apparatus which conveys in a plane is not shown, as it is illustrated in FIGS. 1, 6 and 7. Vertical shafts 87, 87' are driven by a shaft 84, which is mounted in side frames 83, 83' of the machine, and two bevel gearings 85, 86 and 85', 86'. Crescent-shaped wiping blades 88, 88' are carried by the shafts 87, 87' at their lower ends and rotate in a horizontal direction in opposite senses. A screw 89 extends parallel to the shaft 84 and has right-hand and left-hand screw threads in threaded engagement with guiding and bearing members 90, 90', respectively. The screw 89 is rotatably mounted in the side frame 83' and held against longitudinal displacement and carries a handwheel on its end portion extending outwardly of the side frame.

The guiding and bearing members 90, 90' are slidably mounted on guide pins 91, 91', which are secured in the side frames of the machine. The free ends of the guiding and bearing members 90, 90' embrace the hubs of the bevel wheels 85, 85'. The guiding and bearing members 90, 90' are also provided with bearings for the vertical shafts 87, 87', as is indicated in FIG. 8. The bevel wheels 85, 85' are longitudinally slidably mounted on the shaft 84 and held against rotation. The hubs of the bevel wheels 84 are rotatably mounted in the guiding and bearing members 90, 90' and held against longitudinal displacement. A rotation of the screw 89 will symmetrically displace the guiding and bearing members on the guide pins 91, 91' toward the center line of the machine. In this way, the crescent-shaped wiping blades 88, 88' and their drive means can be adjusted to workpieces of different widths. In conjunction with a segment 93, which rotates vertically about a horizontal shaft 92 and whose circular path extends partly between two conveyor belts 96, 96' (FIG. 8), the wiping blades ensure a reliable infolding of the trailing bottom flap 5a under the subsequently infolded leading bottom flap 5b of the crossed-bottom sack 5, which is received at the same time between the above-mentioned conveyor belts 96, 96' so that the bottom flaps are held down.

The relative adjustment of those elements of the apparatus which act to close the bottom is diagrammatically illustrated in FIGS. 9a, 9b, 10a, 10b, 11a, 11b, which show three different phases of movement in top plan views and side elevations, respectively. The revolving speed of the horizontally rotating wiping blades 88, 88' and of the vertically rotating segment 93 is, e.g., twice the speed of travel of the creasing gripper device which moves the workpiece 5 and is not shown here. This device is illustrated in FIG. 5 The above-mentioned speed relation is apparent in FIGS. 9a, 9b, 10a, 10b, 11a and 11b from the relation of the workpiece 5 to the infolding elements 88, 88' and 93 in the three phases which are shown.

FIGS. 9a and 9b illustrate the bottom closing operation in a phase in which the wiping blades 88, 88' are about to infold the trailing bottom flap 5a forwardly. At the same time, the conveyor belts 96, 96' moving over pulleys 94, 94', 95, 95' (see also FIG. 8) have begun to infold the leading bottom flap 5b rearwardly. The movements of the above-mentioned tools for infolding the bottom flaps are so adjusted to each other that the trailing flap is laid under the leading flap. To reach with its forward tip that point of its circular path which is next to the path of travel of those portions of the workpiece which are not infolded, the vertically rotating segment 93 must rotate through 60° from the position shown in FIG. 9a.

FIGS. 10a and 10b show the bottom closing operation in a phase in which the wiping blades 88, 88' slide on both sides from the trailing bottom flap 5a and the rotating segment 93 has descended on its circular path and is about to hold down the flap 5a. At the same time, the leading bottom flap 5b has been moved entirely under the conveyor belts so that it is further infolded.

FIGS. 11a and 11b show one of the final phases of the infolding of the bottom flaps. The wiping blades 88, 88' have left the trailing bottom flap and the segment 93 holds down the bottom flap until the infolding has been completed. The segment extends below the wiping blades and advances relative to the workpiece so that the bottom flap 5a still held by the creasing gripper is smoothed and a reverse bending of the leading edge of the bottom flap by the other bottom flap 5b is prevented. The wiping blades must be on a higher level for engaging the flap on a sufficiently high level during infolding. The segment 93 cannot engage the trailing end of the leading bottom flap 5b because the leading end of the workpiece 5 has already moved between the supporting belts 1, 1' (FIG. 8) and the conveyor belts 96, 96' and the leading bottom flap 5b has been laid down on the trailing bottom flap 5a under the action of the deflecting roller 95. In that phase of the infolding operation which is shown in FIGS. 10a and 10b, the leading bottom crease is released from the leading creasing gripper 11 (see also FIG. 1). The further conveyance is effected by the trailing creasing gripper 12, which does not open until the leading portion of the workpiece 5 enters between the feed rolls 2f, 2f', 97 (FIG. 1), which continue the feeding of the workpiece and press the bottom flaps 5a, 5b on each other to complete the closing of the crossed-bottom sack.

What is claimed is:

1. In an apparatus for making bags one end of which is closed by a satchel bottom and the other end being open, means for creasing the leading and trailing bottom flaps of the open satchel bottoms along a definite line each, means for conveying the bags along a horizontal path in the direction of their longitudinal axes, and means for closing the satchel bottoms by folding them along said crease lines, said creasing means comprising two tucker blades rotatable about a common shaft and a plurality of gripper bars, said gripper bars being secured to endless conveyor means and cooperating with said tucker blades for making said crease lines, wherein said gripper bars are further adapted to convey the bags along said horizontal path to said bottom closing means.

2. Apparatus as defined in claim 1, further comprising main drive means for driving said apparatus and a branch drive for driving said tucker blades and said gripper bars, said branch drive being coupled to said main drive means and comprising a clutch for jointly adjusting the phase angle of said tucker blades and said gripper bars with respect to said main drive means.

3. Apparatus as defined in claim 1, wherein said plurality of gripper bars are arranged in pairs on said conveyor means, one gripper bar of each said pair cooperating with one of said tucker blades for creasing the leading bottom flap and the other gripper bar of each said pair cooperating with the other of said tucker blades for creasing the trailing bottom flap, and wherein the gripper bars for the leading bottom flap and the gripper bars for the trailing bottom flap are each secured to separate conveyor means.

4. Apparatus as defined in claim 3, wherein two separate branch drives are provided for the tucker blade and gripper bars for the leading bottom flap on the one hand and for the tucker blade and gripper bars for the trailing bottom flap on the other hand, and wherein a clutch is provided in one of said branch drives for jointly adjusting the phase angle of the tucker blade and gripper bars driven by said one branch drive.

5. Apparatus as defined in claim 1, wherein each of said gripper bars comprises two clamping elements cooperating substantially with their front faces for gripping the material tucked in by one of said tucker blades, and wherein the ends of each gripper bar are guided by means avoiding torsion of said gripper bars.

6. Apparatus as defined in claim 5, wherein said guide means comprise carriages mounted to the ends of said gripper bars and running in guide rails.

7. Apparatus as defined in claim 1, further comprising cams adapted to control said tucker blades, wherein said tucker blades are mounted resiliently and pivotally to said shaft.

8. Apparatus as defined in claim 1, wherein said bottom closing means only comprises rotating tools.

9. Apparatus as defined in claim 8, wherein said rotating tools comprise a pair of folding fingers rotatable about vertical shafts and a folding segment arranged downstream of said folding fingers and rotatable about a horizontal shaft, said folding fingers and said folding segment cooperating for folding the trailing bottom flap along said crease line, and wherein said folding segment is adapted to rotate contact-free from said horizontal path of conveyance of the bags and has a higher speed than the bags.

References Cited

UNITED STATES PATENTS

| | | |
|---|---|---|
| 2,125,306 | 8/1938 | Novick. |
| 2,163,278 | 6/1939 | Hayes _____ 93—27 |
| 3,186,313 | 6/1965 | Bechle _____ 93—27 |
| 3,196,591 | 7/1965 | Guido _____ 93—36.9 X |
| 1,847,998 | 3/1932 | Bergstein _____ 93—52 X |

FOREIGN PATENTS

| | | |
|---|---|---|
| 1,377,558 | 9/1964 | France. |

WAYNE A. MORSE, JR., Primary Examiner

U.S. Cl. X.R.

93—35, 84